United States Patent
Oh et al.

(10) Patent No.: US 9,382,994 B2
(45) Date of Patent: Jul. 5, 2016

(54) PULLEY ASSEMBLY OF COMPRESSOR AND METHOD OF MANUFACTURING THE SAME

(71) Applicant: Halla Climate Control Corp., Daejeon-si (KR)

(72) Inventors: Sung-Taeg Oh, Daejeon-si (KR); Suk-Jae Chung, Daejeon-si (KR)

(73) Assignee: HALLA CLIMATE CONTROL CORP., Daejeon-si (KR)

(*) Notice: Subject to any disclaimer, the term of this patent is extended or adjusted under 35 U.S.C. 154(b) by 190 days.

(21) Appl. No.: 13/791,049

(22) Filed: Mar. 8, 2013

(65) Prior Publication Data

US 2013/0303320 A1 Nov. 14, 2013

(30) Foreign Application Priority Data

May 8, 2012 (KR) .............................. 2012-0048673

(51) Int. Cl.

| | |
|---|---|
| *F16H 55/36* | (2006.01) |
| *F16H 55/30* | (2006.01) |
| *F16D 3/00* | (2006.01) |
| *F16H 55/14* | (2006.01) |
| *B22D 17/00* | (2006.01) |
| *F16H 55/42* | (2006.01) |
| *B22D 19/04* | (2006.01) |

(52) U.S. Cl.
CPC ............... *F16H 55/36* (2013.01); *B22D 17/00* (2013.01); *B22D 19/04* (2013.01); *F16H 55/42* (2013.01); *Y10T 29/4998* (2015.01)

(58) Field of Classification Search
CPC ... F16H 55/36; F16H 2055/366; F16H 35/10; F16F 15/126; F16D 3/76
USPC ................................................ 474/94, 166, 152
See application file for complete search history.

(56) References Cited

U.S. PATENT DOCUMENTS

| | | | | |
|---|---|---|---|---|
| 2,884,286 | A | * | 4/1959 | Pieper ........................... 384/547 |
| 4,518,372 | A | * | 5/1985 | Dye ................................ 474/94 |
| 4,781,659 | A | * | 11/1988 | Gebhardt ........................ 474/94 |
| 5,637,041 | A | * | 6/1997 | Hamaekers et al. ............ 464/90 |
| 5,988,015 | A | * | 11/1999 | Riu ............................... 74/574.2 |

(Continued)

FOREIGN PATENT DOCUMENTS

| | | |
|---|---|---|
| JP | 2005-257059 | 9/2005 |
| JP | 2005-264989 | 9/2005 |

(Continued)

OTHER PUBLICATIONS

International Search Report for Application No. PCT/KR2013/001896, 3 pages, dated Jun. 12, 2013.

*Primary Examiner* — Henry Liu
(74) *Attorney, Agent, or Firm* — Nelson Mullins Riley & Scarborough LLP; Anthony A. Laurentano

(57) ABSTRACT

Disclosed therein are a pulley assembly for a compressor and a manufacturing method of the same, which can prevent possible damages during processing and is fit for high-temperature environment because a pulley is made of magnesium alloy.

The pulley assembly includes: a cylindrical hollow pulley made of magnesium alloy; an inner ring formed integrally with the pulley by insert injection molding, the inner ring being fixed to the inner circumferential surface of the pulley and made of a different material from the pulley; and a bearing forcedly pressed and fixed to the inner circumferential surface of the inner ring.

11 Claims, 14 Drawing Sheets

(56) References Cited

U.S. PATENT DOCUMENTS

| | | | |
|---|---|---|---|
| 6,106,421 A * | 8/2000 | Graber et al. | 474/94 |
| 6,189,639 B1 * | 2/2001 | Fuse et al. | 180/231 |
| 6,332,842 B1 * | 12/2001 | Tabuchi et al. | 464/33 |
| 6,494,799 B1 * | 12/2002 | Ochiai | 474/94 |
| 6,500,085 B2 * | 12/2002 | Kawachi | 474/199 |
| 6,702,681 B1 * | 3/2004 | Ochs | 464/90 |
| 6,722,993 B2 * | 4/2004 | Tabuchi et al. | 464/34 |
| 6,802,779 B2 * | 10/2004 | Tabuchi et al. | 464/32 |
| 6,913,538 B2 * | 7/2005 | Tabuchi et al. | 464/32 |
| 6,918,835 B2 * | 7/2005 | Aoki et al. | 464/32 |
| 7,025,680 B2 * | 4/2006 | Tabuchi et al. | 464/32 |
| 7,048,661 B2 * | 5/2006 | Shibata et al. | 474/94 |
| 7,055,243 B2 * | 6/2006 | Hodjat et al. | 29/892.11 |
| 7,066,819 B2 * | 6/2006 | Ueda et al. | 464/32 |
| 7,121,947 B2 * | 10/2006 | Ueda et al. | 464/10 |
| 7,204,772 B2 * | 4/2007 | Huber | 474/94 |
| 7,300,372 B2 * | 11/2007 | Riu | 474/94 |
| 7,850,557 B2 * | 12/2010 | Moriya et al. | 474/94 |
| 7,850,558 B2 * | 12/2010 | Oh | 474/94 |
| 7,909,701 B2 * | 3/2011 | Ishikawa et al. | 464/32 |
| 7,993,228 B2 * | 8/2011 | Nosaka et al. | 474/170 |
| 7,998,008 B2 * | 8/2011 | Kamdem et al. | 474/94 |
| 8,021,253 B2 * | 9/2011 | Dell et al. | 474/74 |
| 8,038,554 B2 * | 10/2011 | Watanabe et al. | 474/94 |
| 8,070,632 B2 * | 12/2011 | Yuan | 474/94 |
| 8,177,669 B2 * | 5/2012 | Ishida et al. | 474/94 |
| 8,192,312 B2 * | 6/2012 | Ali et al. | 474/94 |
| 8,262,520 B2 * | 9/2012 | Shimamura et al. | 474/94 |
| 8,302,753 B2 * | 11/2012 | Antchak et al. | 192/55.5 |
| 8,308,368 B2 * | 11/2012 | Blair et al. | 384/418 |
| 2001/0016529 A1 * | 8/2001 | Kawachi | 474/94 |
| 2002/0198056 A1 * | 12/2002 | Tabuchi et al. | 464/32 |
| 2003/0199348 A1 * | 10/2003 | Huber | 474/94 |
| 2004/0009818 A1 * | 1/2004 | Son | 464/32 |
| 2004/0063503 A1 * | 4/2004 | Aoki et al. | 464/32 |
| 2004/0067807 A1 * | 4/2004 | Shibata et al. | 474/161 |
| 2004/0166974 A1 * | 8/2004 | Hodjat | 474/94 |
| 2004/0176200 A1 * | 9/2004 | Nosaka et al. | 474/166 |
| 2004/0192479 A1 * | 9/2004 | Matsuno | 474/70 |
| 2005/0141797 A1 * | 6/2005 | Kinno et al. | 384/492 |
| 2005/0209009 A1 * | 9/2005 | Son | 464/32 |
| 2005/0239555 A1 * | 10/2005 | Ueda et al. | 464/32 |
| 2006/0084541 A1 * | 4/2006 | Nosaka et al. | 474/170 |
| 2006/0089201 A1 * | 4/2006 | Nosaka et al. | 464/30 |
| 2006/0094547 A1 * | 5/2006 | Xu et al. | 474/94 |
| 2006/0172832 A1 * | 8/2006 | Watanabe et al. | 474/94 |
| 2006/0194663 A1 * | 8/2006 | Kouno | 474/166 |
| 2006/0264282 A1 * | 11/2006 | Moriya et al. | 474/94 |
| 2006/0270498 A1 * | 11/2006 | Kanou et al. | 474/70 |
| 2007/0224431 A1 * | 9/2007 | Decker et al. | 428/447 |
| 2007/0232427 A1 * | 10/2007 | Ueno et al. | 474/199 |
| 2007/0232428 A1 * | 10/2007 | Hamada et al. | 474/199 |
| 2008/0280046 A1 * | 11/2008 | Bryden et al. | 427/327 |
| 2008/0280709 A1 * | 11/2008 | Gouadec | 474/94 |
| 2008/0314709 A1 * | 12/2008 | Ishikawa et al. | 192/55.1 |
| 2009/0005201 A1 * | 1/2009 | Shimamura et al. | 474/94 |
| 2009/0016656 A1 * | 1/2009 | Blair et al. | 384/286 |
| 2009/0105021 A1 * | 4/2009 | Amati et al. | 474/94 |
| 2009/0269501 A1 * | 10/2009 | Song et al. | 427/470 |
| 2009/0318252 A1 * | 12/2009 | Riu | 474/94 |
| 2010/0099527 A1 * | 4/2010 | Rolando et al. | 474/94 |
| 2012/0015768 A1 * | 1/2012 | Serkh et al. | 474/94 |
| 2012/0094791 A1 * | 4/2012 | Lee | 474/94 |
| 2012/0231909 A1 * | 9/2012 | Shin | 474/94 |
| 2013/0337952 A1 * | 12/2013 | Berruet et al. | 474/94 |

FOREIGN PATENT DOCUMENTS

| | | |
|---|---|---|
| JP | 2006-70972 | 3/2006 |
| JP | 2007-71319 | 3/2007 |
| KR | 10-2005-0093040 | 9/2005 |

* cited by examiner

Prior Art

Prior Art

PULLEY ASSEMBLY OF COMPRESSOR AND METHOD OF MANUFACTURING THE SAME

CROSS-REFERENCE TO RELATED APPLICATION

This application claims the priority benefit of Korean Patent Application No. 2012-0048673, filed on May 8, 2012, in the Korean Intellectual Property Office, the disclosure of which is incorporated herein by reference.

BACKGROUND OF THE INVENTION

1. Field of the Invention

The present invention relates to a power transmission device of a vehicle, and more particularly, to a pulley assembly and a method of manufacturing the pulley assembly which transmits driving power to a compressor used in an air conditioner for a vehicle.

2. Background Art

In General, a compressor used in an air conditioner receives refrigerant from an evaporator, converts the refrigerant into a refrigerant gas of high-temperature and high-pressure, and provides it to a condenser.

The compressor used in the air conditioner for a vehicle receives a driving force from an engine through a pulley assembly and compresses refrigerant.

Conventionally, the compressor for the vehicle selectively controls that the driving force of the engine is transmitted to the compressor using an electronic clutch.

However, a variable capacity type compressor does not need the electronic clutch because it selectively carries out a compression operation by regulating an inclination angle of a swash plate according to demands of cooling, and hence, a power transmission device for transmitting the driving force of the engine using the variable capacity type compressor is constructed of a clutchless type.

As shown in FIG. 1, the power transmission device of the clutchless type compressor includes a pulley assembly 10 and a limit assembly 30.

Here, the pulley assembly 10 includes a cylindrical hollow pulley 11 and a bearing 12 mounted on an inner circumferential surface of the pulley 11, and is rotated by receiving a driving force of an engine.

An outer wheel 12a of the bearing 12 is forcedly fixed onto the inner circumferential surface of the pulley 11, and a front housing 1a of the compressor is joined to the inner circumferential surface of an inner wheel 12b of the bearing 12.

Moreover, the limit assembly 30 in lieu of the electronic clutch transmits or blocks out the driving force of the pulley assembly 10 to a driving shaft of the compressor, and is mounted on the surface of an outer wall of the pulley 11 of the pulley assembly 10.

Particularly, the limit assembly 30 rotates the driving shaft 1b while rotating together with the pulley assembly 10, and serves to relieve transmission of the driving force if there is a torque exceeding a predetermined value in the compressor or the driving shaft 1b of the compressor cannot be rotated.

The limit assembly 30 includes a hub 31 joined with the driving shaft 1b, a limit 32 joined with the hub 31, and a limit housing 33 having the limit 32 therein and being joined to the pulley.

The limit 32 is broken to prevent that a rotary force transmitted from the pulley 11 is transmitted to the hub 31 when there is a torque exceeding a predetermined value in the compressor or the driving shaft 1b of the compressor cannot be rotated.

In the meantime, the pulley 11 of the pulley assembly is generally made of a steel material, and hence, there is a limit to reduce the total weight of the pulley assembly.

SUMMARY OF THE INVENTION

Accordingly, the present invention has been made to solve the above-mentioned problems occurring in the prior arts, and it is an object of the present invention to provide an improved pulley assembly for a compressor and a method of manufacturing the pulley assembly, which can prevent possible damages during processing and is fit for high-temperature environment because a pulley is made of magnesium alloy.

To achieve the above objects, the present invention provides a pulley assembly for a compressor, which includes a cylindrical hollow pulley and a bearing disposed on the inner circumferential surface of the pulley, wherein the pulley is made of magnesium alloy, a cylindrical inner ring is formed integrally with the inner circumferential surface of the pulley by insert injection molding and is made of a different material from the pulley, and the bearing is fixed to the inner circumferential surface of the inner ring.

Here, the inner ring has movement prevention jaws respectively formed at both ends of an axial direction side thereof, and the bearing is prevented from moving in the axial direction of the inner ring by the movement prevention jaws.

Moreover, uneven portions are respectively formed on the outer circumferential surface of the inner ring and on the inner circumferential surface of the pulley in the opposite direction to each other.

Furthermore, the uneven portions include: a receiving groove formed on the outer circumferential surface of the inner ring; and a receiving protrusion protruding from the inner circumferential surface of the pulley and being accommodated in the receiving groove.

Additionally, the receiving groove is inclined not to coincide with a circumferential direction and an axial direction of the inner ring.

In addition, a plating layer is formed on the outer circumferential surface of the inner ring.

Moreover, the plating layer formed on the outer circumferential surface of the inner ring is formed by one of zinc galvanizing, electroless nickel plating, zinc-nickel plating, and phosphate-zinc plating.

Furthermore, a resin-based coating layer is formed on the outer circumferential surface of the inner ring.

The resin-based coating layer formed on the outer circumferential surface of the inner ring is coated with resin having heat-resistance temperature of more than 250° C.

Moreover, a first coating layer having oxide film layer formed by spark anodizing is formed on the outer surface of the pulley, and a second coating layer having a resin layer formed by electrodeposition is formed on the surface of the first coating layer.

The first coating layer of a first coating step and the second coating layer of a second coating step respectively have a coating thickness within a range of 5 μm to 40 μm.

Furthermore, in another aspect of the present invention, the present invention provides a manufacturing method of a pulley assembly for a compressor including the steps of: (S100) preparing injection molding for molding an inner ring; (S200) insert-injecting magnesium alloy to the prepared inner ring so as to mold a pulley formed integrally with the inner ring; (S300) machining the outer surface of the molded pulley to be fit for the processing size; and (S800) pressing and caulking a bearing into the inner circumferential surface of the inner ring of the processed pulley and assembling the bearing.

Here, in the pulley molding step (S200), the insert-injected magnesium alloy is injected in a melted state or in a semi-solid state.

Additionally, the manufacturing method of the pulley assembly further includes the step of treating the surface of the pulley by a chemical method or an electrochemical method before the bearing assembling step (S800) after the machining process (S300).

The surface treatment step includes a first coating step (S500) of forming a first coating layer on the surface of the pulley, the first coating layer having an oxide film layer formed by spark anodizing.

The manufacturing method of the pulley assembly further includes the step of (S400) defatting the outer surface of the pulley before carrying out the first coating step (S500).

The manufacturing method of the pulley assembly further includes the steps of: (S600) drying the pulley having the oxide film layer through the first coating step (S500); and (S700) forming a second coating layer on the surface of the first coating layer by treating the surface of the dried pulley by electrodeposition.

Moreover, in the pulley molding step (S200), the insert-injected magnesium alloy is injected in a melted state or in a semi-solid state.

As described above, the pulley assembly for the compressor and the method of manufacturing the same according to the present invention has the following effects.

First, the pulley assembly for the compressor can reduce the total weight because the pulley is made of magnesium alloy.

Second, the pulley assembly for the compressor can keep a stably fixed state of the bearing to the pulley to thereby prevent the bearing from running idle in a high temperature situation because the pulley and the inner ring are integrated through insert injection molding and the bearing is forcedly fixed into the inner ring.

Third, because the inner ring of the pulley assembly has a plurality of the receiving grooves formed on the outer circumferential surface thereof and a portion of the pulley is accommodated in the receiving groove during insert injection molding, the inner ring and the pulley are integrated with each other more stably. Particularly, the pulley assembly of the present invention can smoothly transmit a rotary force and prevent an axial movement because the receiving grooves are inclined in a rotational direction or in an axial direction.

Fourth, because the pulley assembly manufactured by the manufacturing method according to the present invention has the double coating layers, the present invention can secure corrosion resistance by the first coating layer even though the second coating layer is peeled off due to abrasion by friction with the belt.

Particularly, the first coating layer of the double coating layers can enhance abrasion resistance by increasing the surface hardness of the pulley because it has an oxide film layer by spark anodizing, and the second coating layer can additionally enhance abrasion resistance and corrosion resistance because it has a resin layer formed by electrodeposition.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
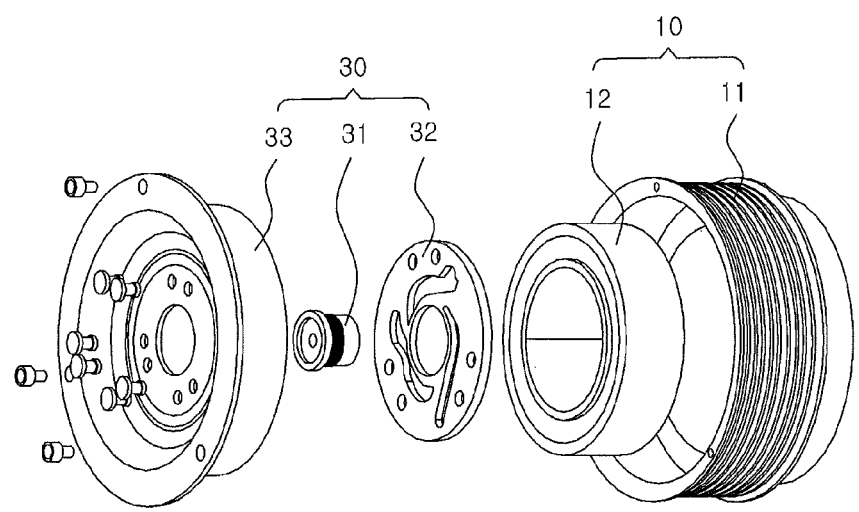
FIG. 1 is an exploded perspective view showing a power transmission device of a clutchless type compressor according to a prior art.
Figure 2:
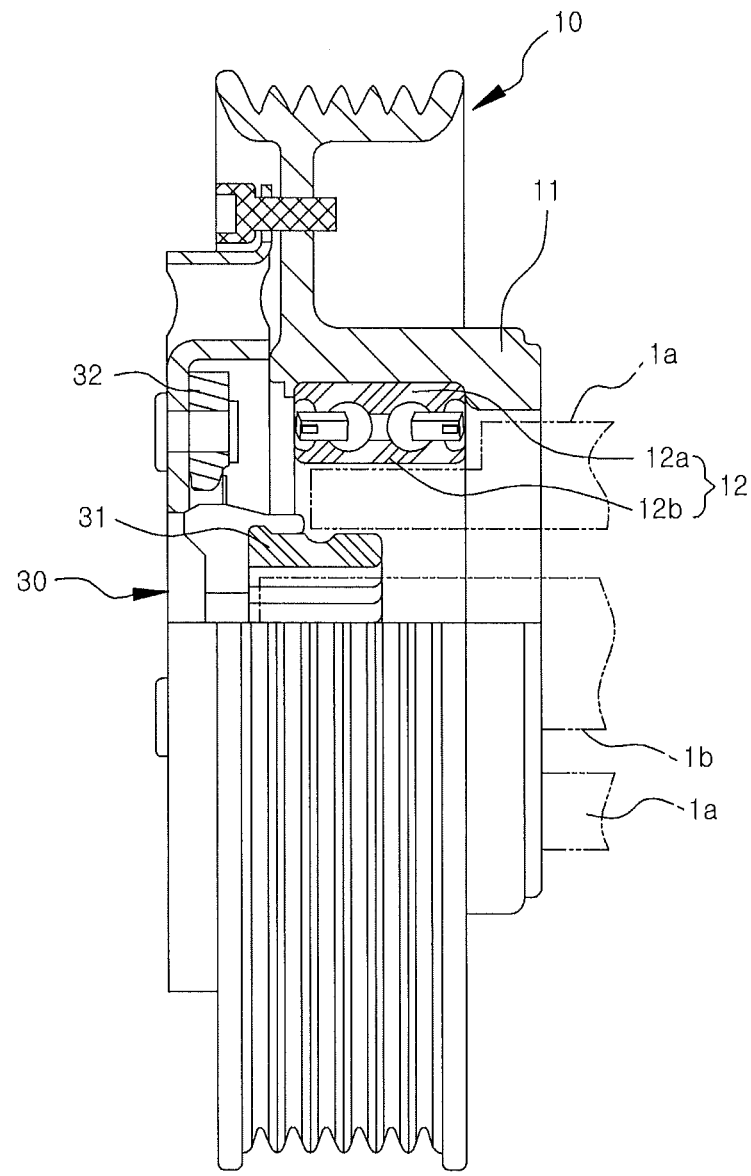
FIG. 2 is a sectional view showing the power transmission device of the clutchless type compressor according to the prior art.
Figure 3:
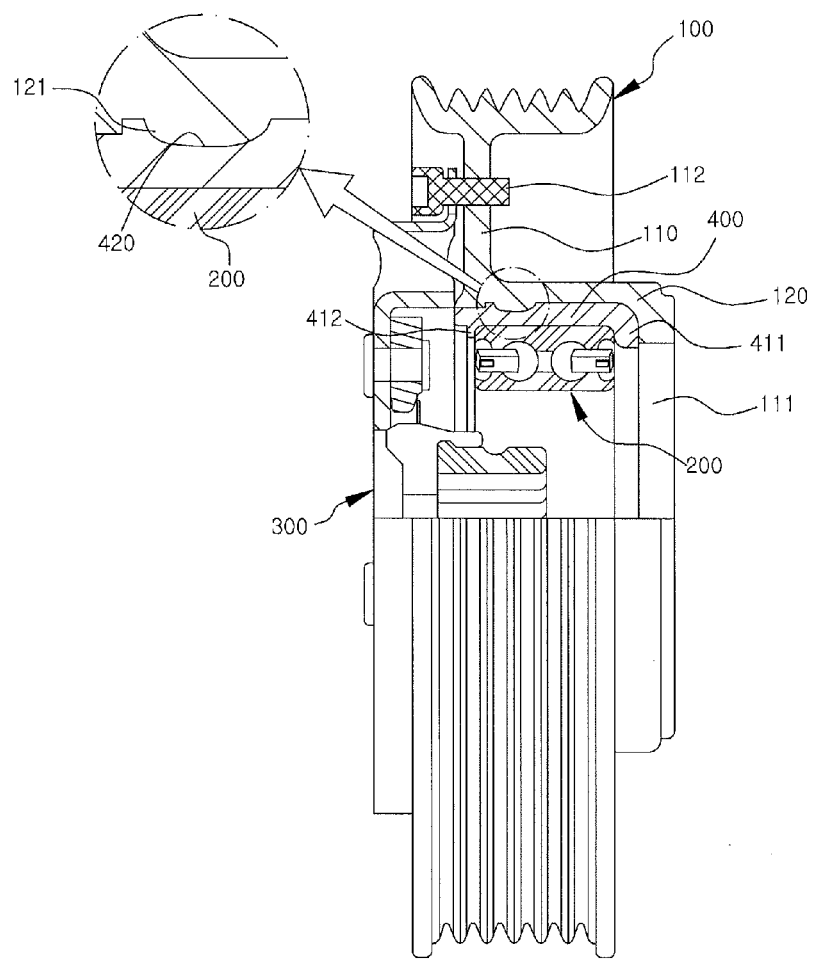
FIG. 3 is a partially sectional view showing an inside structure of a pulley assembly for a compressor according to a preferred embodiment of the present invention.
Figures 3A, 3B:
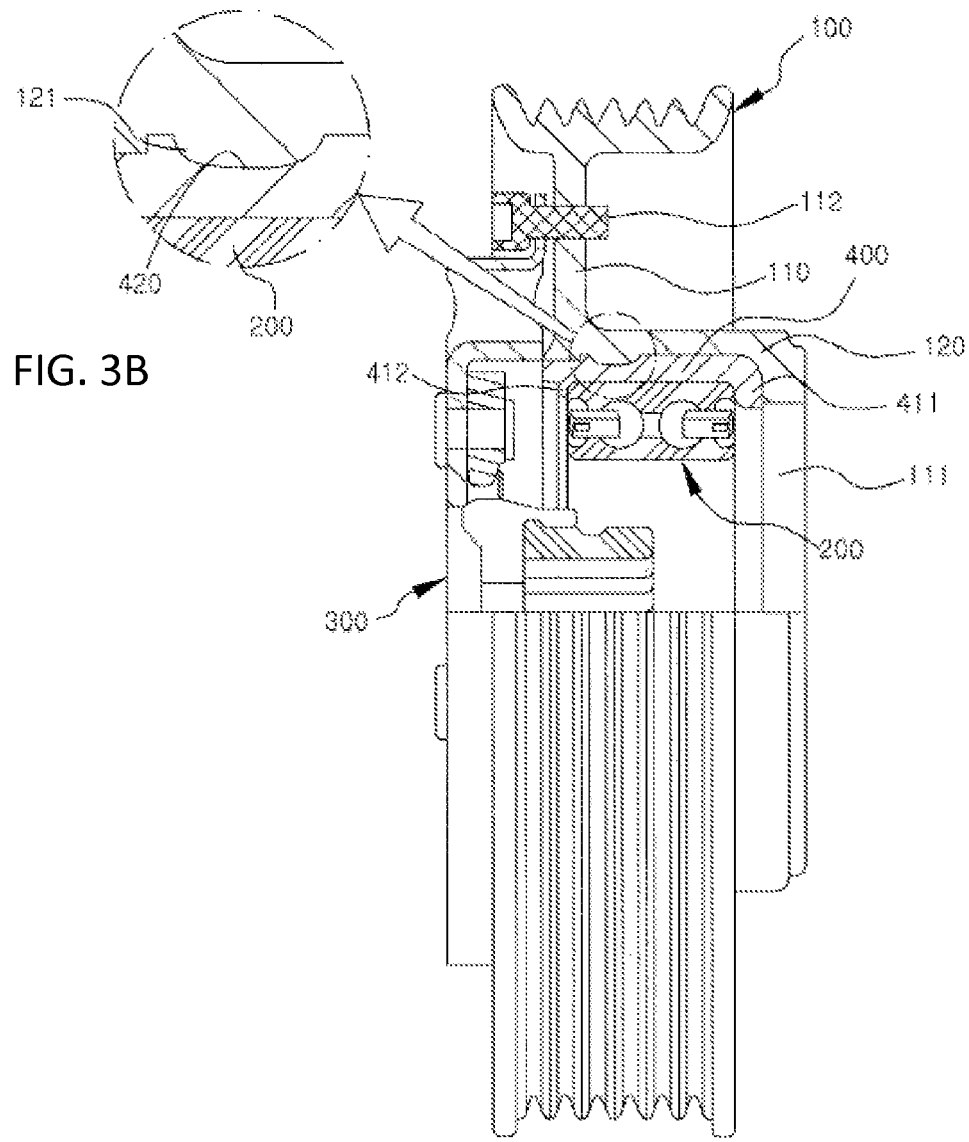

FIG. 3A and FIG. 3B are partially sectional views showing an inside structure of a pulley assembly for a compressor according to a preferred embodiment of the present invention;

As shown in the drawings, the pulley assembly for the compressor according to the preferred embodiment of the present invention includes a pulley 100, a bearing 200, and an inner ring 400.

The components of the pulley assembly will be described in detail as follows.

First, the pulley 100 receives a driving force from an engine. The pulley 100 is in a cylindrical hollow form, and a belt (not shown in the drawing) which is driven by the engine is connected to the outer circumferential surface of the pulley 100.

Particularly, the pulley 100 is made of magnesium alloy.

The pulley 100 includes a partition wall 110 formed therein in order to partition front and rear spaces of the pulley 100; a through hole 111 formed at the center of the partition wall 110 for inserting a driving shaft (not shown) of the compressor into the through hole 111; and a cylindrical hollow boss 120 formed on the wall surface of a rear side of the partition wall 110, namely, the wall surface of the compressor side, the cylindrical hollow boss 120 protruding toward the compressor for mounting the bearing 200.

It is preferable that the partition wall 110 is as thick as it can sufficiently secure a tightening torque of a bolt 112 when an additional component, such as the limit assembly 300, is joined to the partition wall 110 of the pulley 100 with the bolt 112, and in the present invention, the partition wall 110 is at least 3 mm thick.

Furthermore, double coating layers 130 and 140 are respectively formed on the surface of the pulley 100.

That is, the surface of the pulley 100 is worn out more seriously than other parts because the belt gets in contact with the surface of the pulley 100, and especially, considering that magnesium alloy is still lower in Vicker's hardness (Hv) than steel materials, it is natural that the pulley 100 made of magnesium alloy is worn out very seriously. Accordingly, the double coating layers 130 and 140 are additionally formed on the surface of the pulley 100 so as to enhance hardness.

The double coating layers 130 and 140 formed on the surface of the pulley 100 includes a first coating layer 130 coated on the outer surface of the pulley 100 made of magnesium alloy, and a second coating layer 140 re-coated on the surface of the first coating layer 130.

Here, the first coating layer 130 is a coating layer having an oxide film layer by the spark anodizing process. The first coating layer 130 serves to enhance the surface hardness of the pulley 100 and to secure abrasion resistance and corrosion resistance even though the second coating layer 140 is peeled due to abrasion of the second coating layer 140.

Pores are formed on the corresponding film layer while the oxide film layer of the first coating layer 130 is formed. However, the pores serve to increase a contact force of a resin layer of the second coating layer 140 because the pores increase a contact area.

Additionally, the second coating layer 140 is a coating layer having the resin layer of the first coating layer 130. The second coating layer 140 covers the pores formed on the surface of the oxide film layer of the first coating layer 130 so as to protect the surface crumblable by the pores. In addition, the second coating layer 140 serves to smoothen the surface of the first coating layer 130 and to increase abrasion resistance and corrosion resistance.

As described above, the first coating layer 130 and the second coating layer 140 are in complementary relations.

Next, the bearing 200 supports the pulley 100 which is rotatably mounted at the compressor.

The bearing 200 is located on the inner circumferential surface of the boss 120 of the pulley 100 and fixed to the pulley 100 by the inner ring 400.

Next, the inner ring 400 serves to fix the bearing 200 to the pulley 100.

The inner ring 400 is a cylindrical ring made of a different material from the pulley 100, for instance, made of steel, and is formed integrally with the inner circumferential surface of the boss 120 of the pulley 100 through insert injection molding. The bearing 200 is forcedly fixed to the inner circumferential surface of the inner ring 400.

That is, considering that the pulley 100 is made of magnesium alloy, the inner ring 400 according to the present invention serves to keep the stably fixed state of the bearing 200 to the pulley 100 to prevent the bearing 200 from running idle.

Particularly, because the inner ring 400 is formed integrally with the pulley 100 through the insert injection molding even though the inner ring 400 is made of the same material as the bearing 200, it can prevent that the bearing 200 runs idle.

Figure 5:
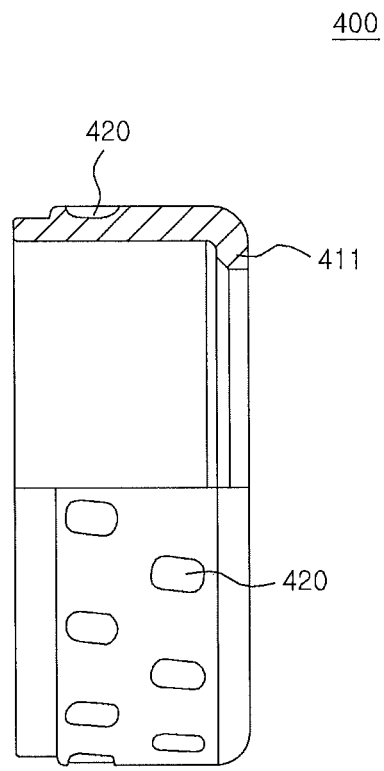
FIGS. 5 to 10 are partially sectional views showing the manufacturing process of the pulley assembly for the compressor of the present invention.

Moreover, as shown in FIG. 5, the inner ring 400 has movement prevention jaws 411 and 412 respectively formed at both ends of an axial direction side of the inner ring 400 in order to prevent an axial movement of the bearing 200 pressed into the inner ring 400.

The movement prevention jaws 411 and 412 may be formed in such a manner that the bearing 200 is forcedly pressed into the inner ring 400 and both ends of the inner ring 400 are caulked. However, as shown in the drawings, preferably, one movement prevention jaw 411 is curved at one end of the inner ring 400 (See FIGS. 5 to 10), and after that, the bearing 200 is forcedly pressed into the inner ring 400 and caulking is carried out at the other end of the inner ring 400 (See FIG. 10) to thereby form the other movement prevention jaw 412.

Of course, the bearing 200 may be directly formed on the pulley 100 by insert injection molding. However, such a structure may cause a decrease in reliability of operation of the bearing 200, for instance, fixing of a ball, is not desirable because the bearing 200 is impossible to be replaced with a new one when the bearing 200 is out of order.

In the meantime, the inner ring 400 has an uneven portion formed on the outer circumferential surface thereof and the boss 120 of the pulley 100 has an uneven portion formed on the inner circumferential surface thereof, and the uneven portions of the inner ring 400 and the boss 120 are formed in the opposite direction to each other.

The uneven portions serve to increase a contact area between the inner ring 400 and the pulley 100 at the time of the insert injection molding, and also serve to prevent the inner ring 400 from moving in the axial direction or in the circumferential direction of the pulley 100 even though there is a difference in thermal expansion between the pulley 100 and the inner ring 400 in the high temperature situation.

The uneven portion is formed by a plurality of receiving grooves 420 formed on the outer circumferential surface of the inner ring 400. That is, at the time of the insert injection molding, by the receiving grooves 420 formed on the outer circumferential surface of the inner ring 400, a receiving protrusion 121 which is accommodated in the receiving groove 420 is formed on the inner circumferential surface of the pulley 100.

Of course, not shown in the drawings, but the receiving protrusion 121 may be formed on the outer circumferential surface of the inner ring 400 and the receiving grooves (420) in which the receiving protrusion 121 is accommodated may be formed on the inner circumferential surface of the boss 120 of the pulley 100 by the insert injection molding.

Particularly, it is preferable that the receiving grooves 420 are inclinedly formed not to be coincided to the circumferential direction and the axial direction of the inner ring 400. The reason is to prevent the inner ring 400 from moving in the rotational direction of the pulley 100 because the direction of the receiving grooves 420 does not coincide with the circumferential direction of the inner ring 400, and to prevent the inner ring 400 from moving in the axial direction of the pulley 100 because the direction of the receiving grooves 420 does not coincide with the axial direction of the inner ring 400.

Moreover, in the present invention, a plating layer (not shown in the drawings) is formed on the outer circumferential surface of the inner ring 400.

The plating layer is to prevent galvanic corrosion with the pulley 100, and it is preferable that the plating layer is formed by one of zinc galvanizing, electroless nickel plating, zinc-nickel plating, and phosphate-zinc plating.

Of course, a resin-based coating layer instead of the plating layer may be formed on the outer circumferential surface of the inner ring 400. In this instance, it is preferable that the coating layer is coated with resin having heat-resistance temperature of more than 250° C.

Figure 4:
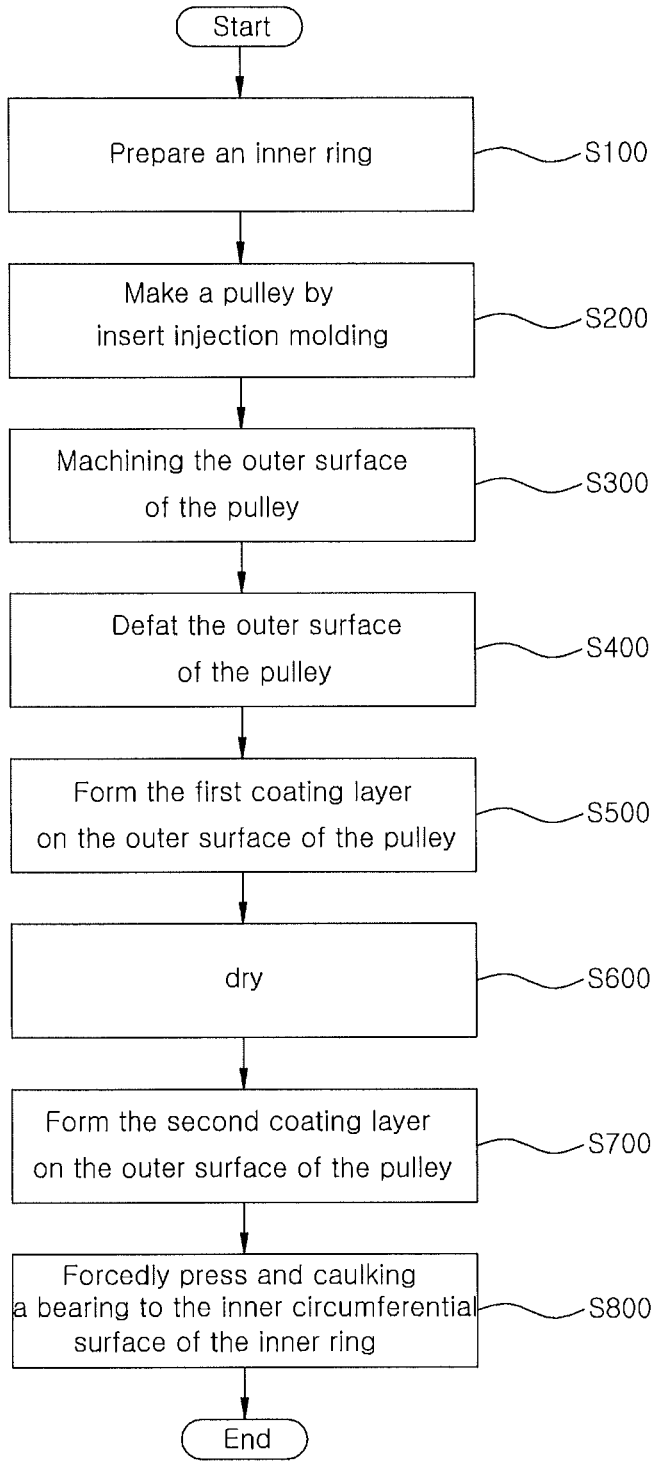
FIG. 4 is a flow chart showing a manufacturing process of the pulley assembly for the compressor of the present invention.

Hereinafter, referring to the flow chart of FIG. 4 and the partially sectional views of FIGS. 5 to 10, the manufacturing process of the pulley assembly for the compressor according to the present invention will be described in more detail.

First, the inner ring 400 is prepared (S100).

As shown in FIG. 5, the inner ring 400 has a plurality of the receiving grooves 420 formed on the outer circumferential surface thereof and the plating layer (not shown) formed thereon.

Figure 6:
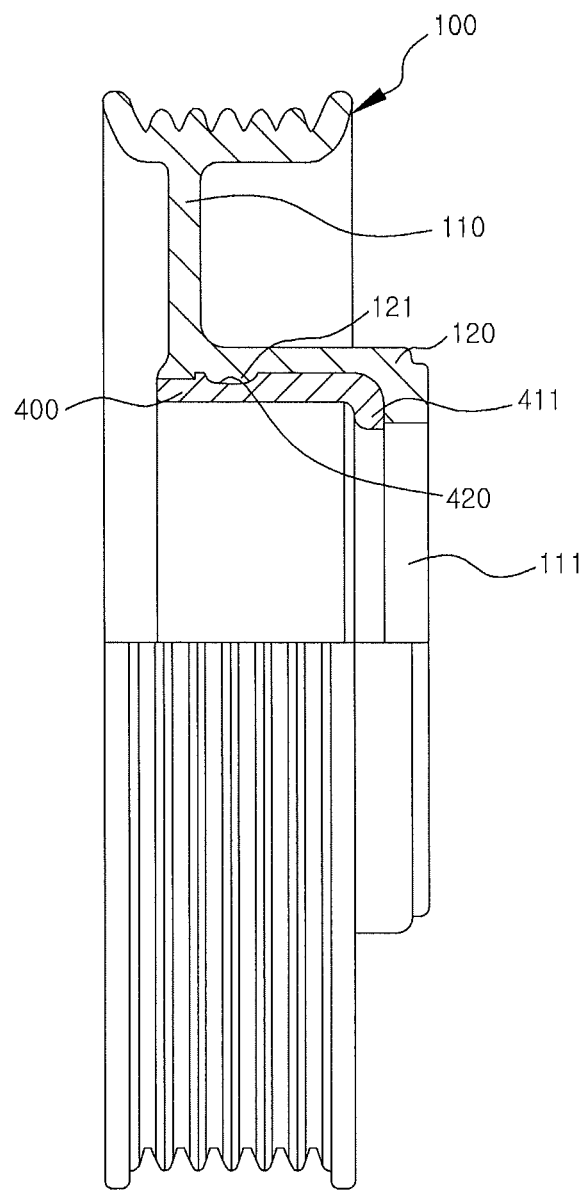

Next, the pulley 100 is molded by insert-molding magnesium alloy to the prepared inner ring 400 (S200). In this instance, as shown in FIG. 6, the inner ring 400 is formed integrally with the pulley 100.

In other words, through the insert injection molding, the pulley 100 is molded and the inner ring 400 is formed integrally with the inner circumferential surface of the boss 120 of the pulley 100. In this instance, the receiving protrusion 121 which is accommodated in the receiving grooves 420 of the inner ring 400 is formed on the inner circumferential surface of the boss 120 to thereby prevent an unwanted movement of the inner ring 400 and to thereby smoothly transmit the rotary force of the pulley 100 to the inner ring 100.

Moreover, it is preferable that the portion where the belt which is the outer surface of the pulley 100 is connected has machining allowance.

Furthermore, the injection molding process can eject magnesium alloy in a melted state or in a semi-solid state, and it may be freely selected according to work environments.

Figure 7:
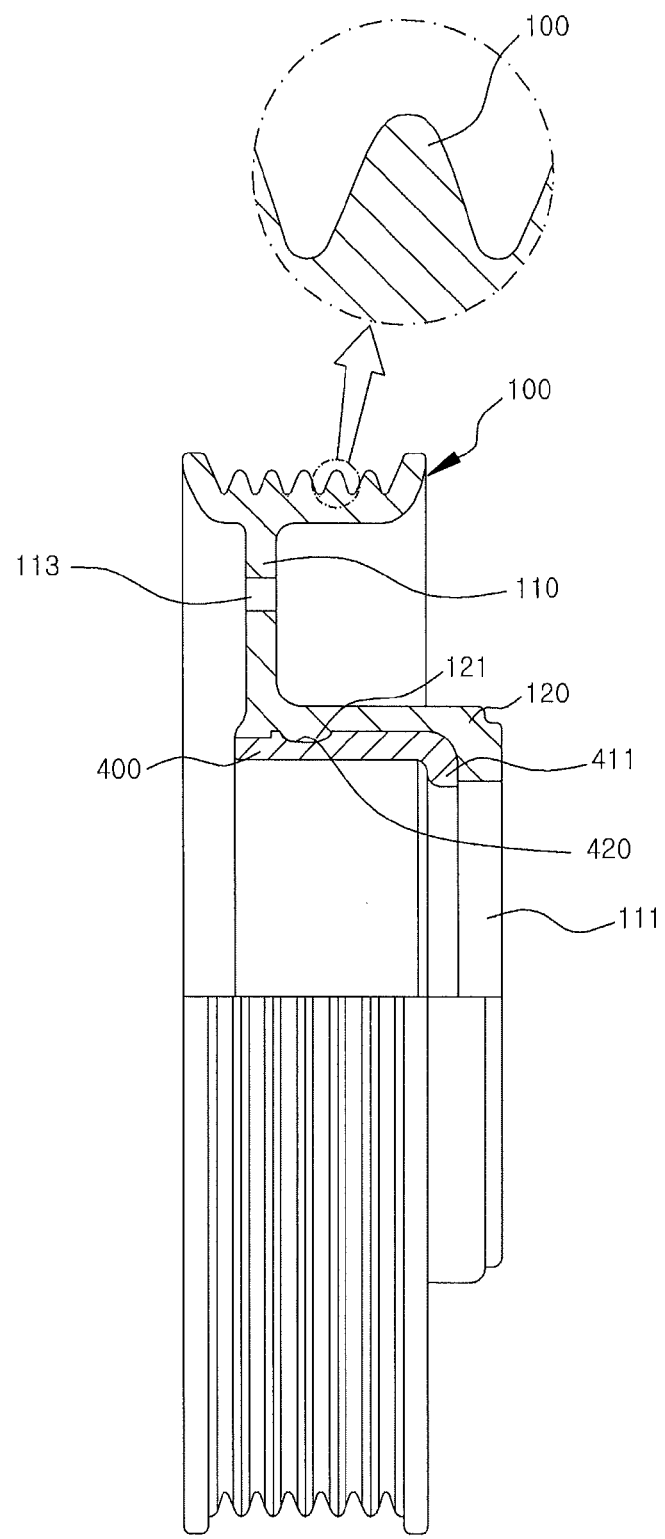
Figures 7A, 7B:
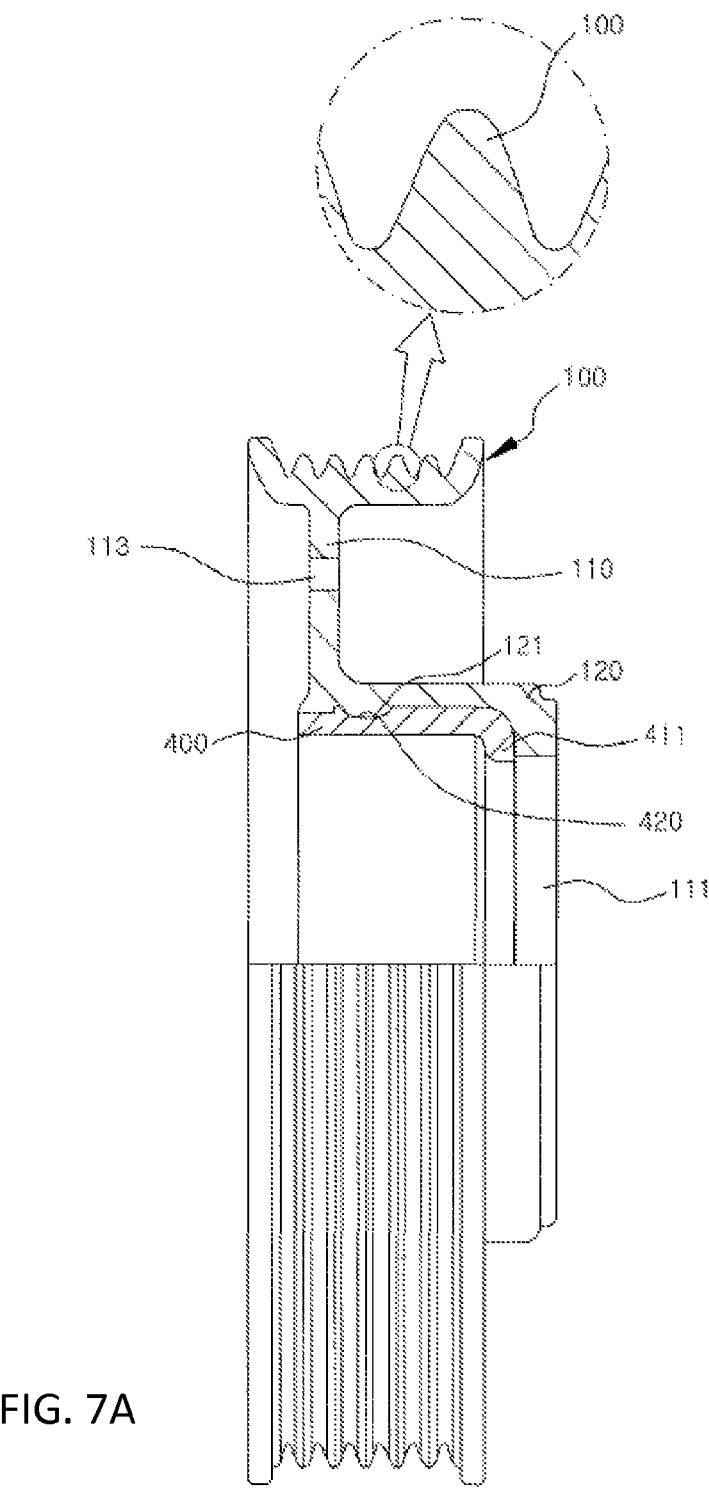

Next, when the injection molding of the pulley 100 is finished, as shown in FIG. 7A and FIG. 7B, the outer surface of the molded pulley 100 is machined (S300) to be fit for the processing size.

That is, the connected portion of the belt which is the outer surface of the pulley 100 is machined so as to stably connect the belt.

Moreover, during the machining work, various processing processes, such as tapping and drilling, for joining various components, such as the limit assembly, to the pulley assembly are carried out.

Next, when the machining work on the outer surface of the pulley 100 is finished, defatting is carried out to the surface of the pulley 100 (S400).

In this instance, defatting of the surface of the pulley 100 is carried out by removing fat remaining on the surface of the pulley 100.

Next, when defatting of the surface of the pulley 100 is finished, surface treatment is carried out to the surface of the pulley 100.

The surface treatment is to prevent corrosion which may happen because the pulley 100 is made of magnesium alloy. That is, because magnesium alloy is a metal with a great chemical activity, if the surface of the pulley 100 is not treated, the pulley 100 may be rapidly corroded under a corrosive environment. So, the surface treatment is carried out to prevent corrosion of the pulley 100 made of magnesium alloy.

In the present invention, the surface treatment of the pulley 100 is carried out double in order.

Figure 8:
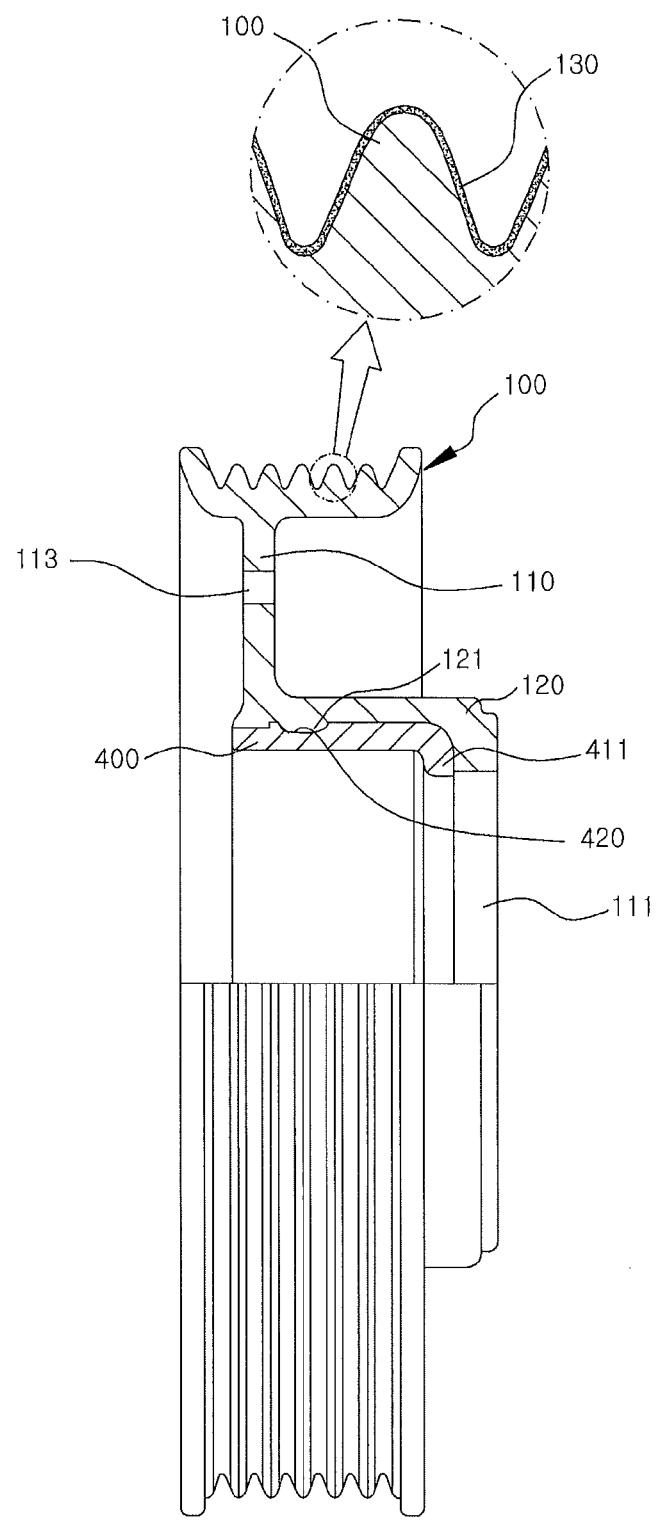
Figures 8A, 8B:
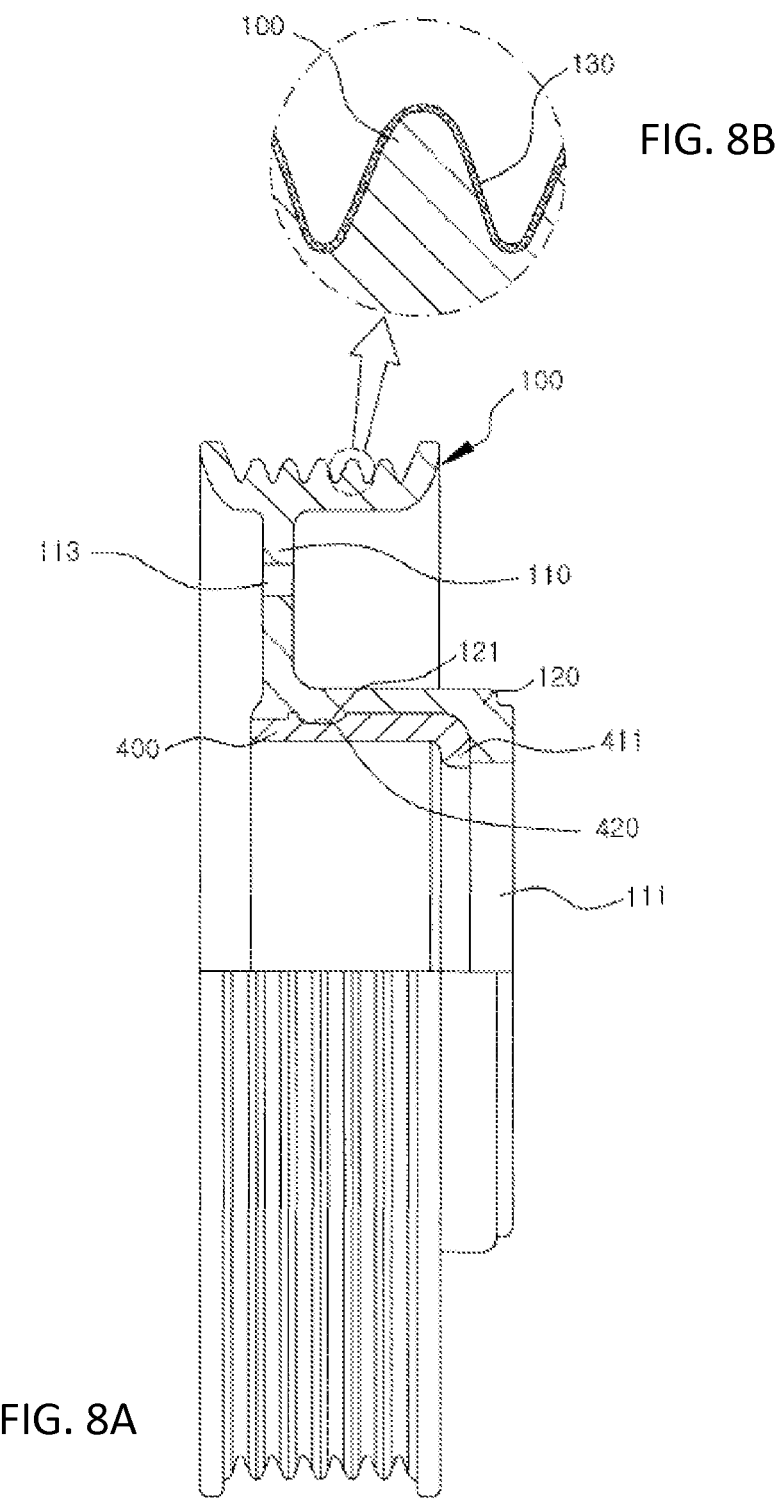
Figure 9:
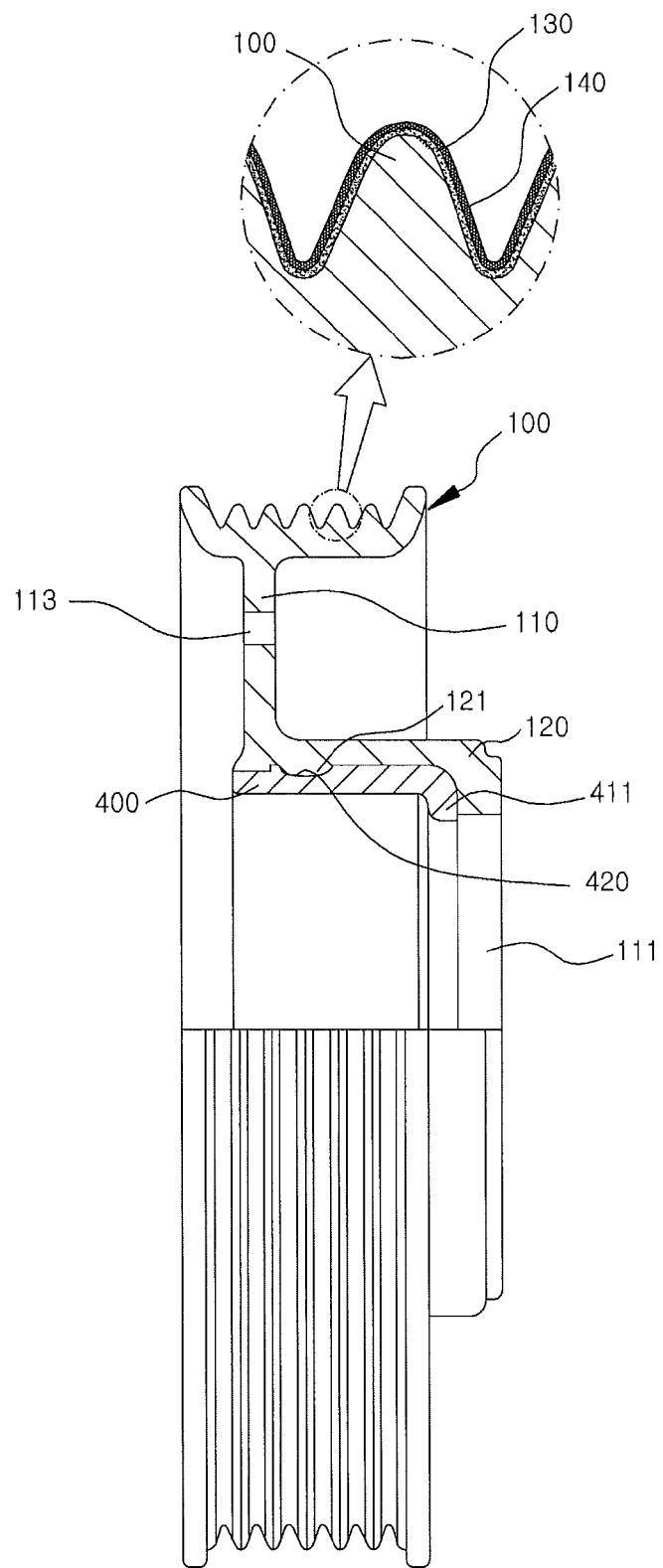
Figures 9A, 9B:
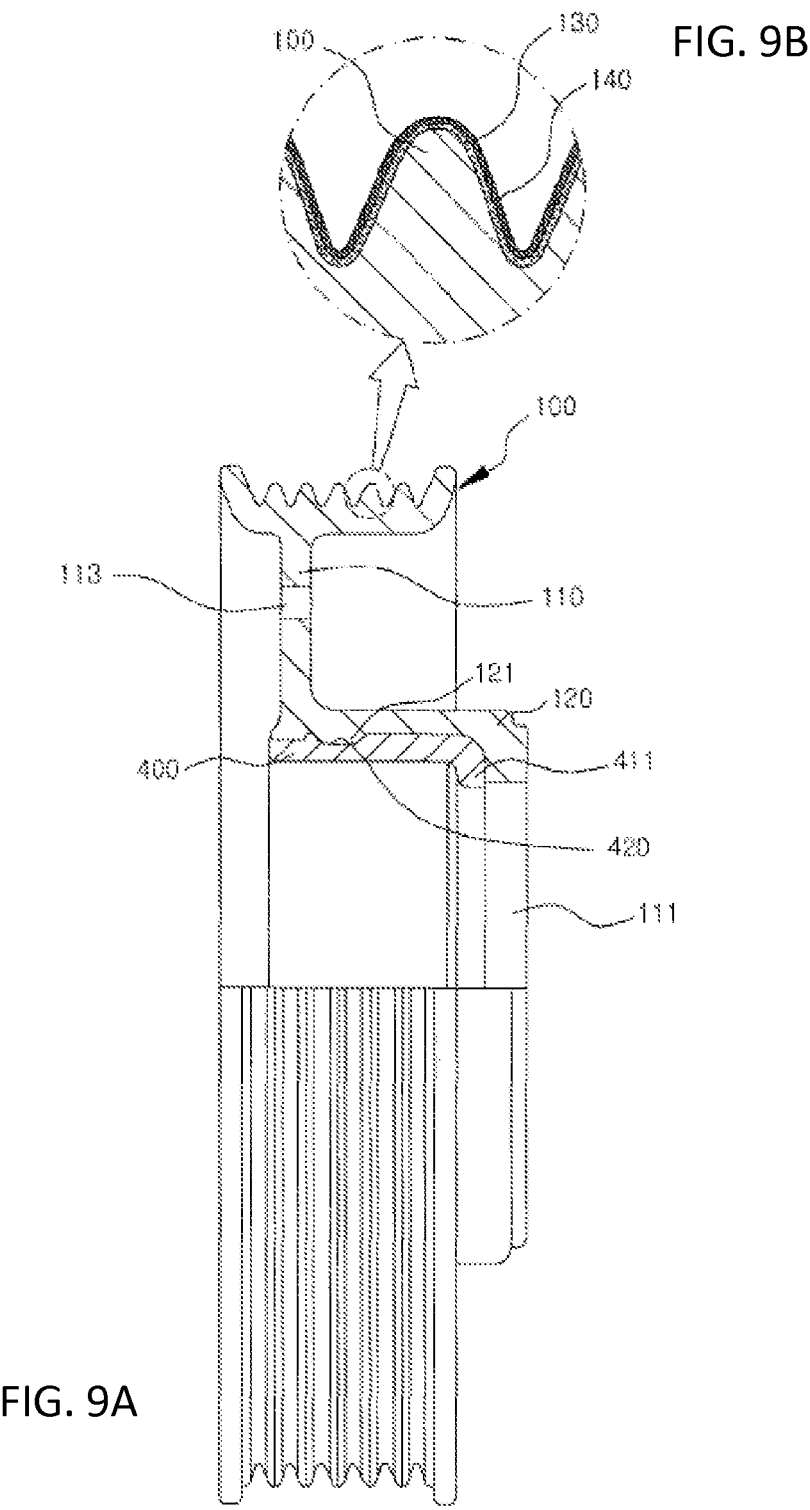

That is, as shown in FIG. 8A and FIG. 8B, the first coating layer 130 having the oxide film layer on the surface of the pulley 100 is carried out through the surface treatment by spark anodizing (S500), and continuously, as shown in FIG. 9A and 9B, after a drying process (S600), the second coating layer 140 having the resin layer on the surface of the first coating layer 130 is carried out through the surface treatment by electrodeposition (S700).

Here, the surface treatment for forming the first coating layer 130 is carried out through an arc spark occurring by applying an electric voltage, a current pulse, a direct current, or an alternating current inside an electrolyte solution. Through the above process, a non-conductor coating layer is formed on the surface of the pulley 100, and while dielectric breakdown of the non-conductor coating layer is repeated, an amorphous anodic oxide film is converted into a crystallized film to thereby obtain a close and solid ceramic film.

Particularly, the first coating layer 130 includes a thin film layer having a strong adhesion through a chemical combination with the pulley 100, a thin film layer formed closely with a high hardness, and a thin film having pores, which are formed on the surface of the pulley 100 in order, so that the first coating layer 130 can obtain abrasion resistance and corrosion resistance.

Moreover, the surface treatment for forming the second coating layer 140 is carried out through electroless nickel plating or electrodeposition, such as zinc immersion coating. The second coating layer 140 formed on the surface of the first coating layer 130 through the surface treatment by electrodeposition makes the surface of the porous thin film layer of the first coating layer 130 smooth and additionally provides abrasion resistance and corrosion resistance.

Of course, after the first coating layer 130 is formed, the second coating layer 140 is formed after the process of drying the pulley 100 is carried out, so that the second coating layer 140 is formed stably.

In the meantime, it is preferable that the first coating layer 130 and the second coating layer 140 formed through the surface treatment of the pulley 100 respectively have a coating thickness within a range of 5 μm to 40 μm.

If the coating layers 130 and 14 have the coating thickness less than 5 μm, a sudden abrasion may occur due to an insufficient coating thickness, but if the coating layers 130 and 140 have the coating thickness exceeding 40 μm, it causes a sudden increase of a manufacturing period of time, an increase of manufacturing costs, and difficulty in tolerance management due to the excessive coating thickness. Accordingly, it is the most preferable that the coating layers 130 and 140 have the coating thickness within the range of 5 μm to 40 μm.

Figure 10:
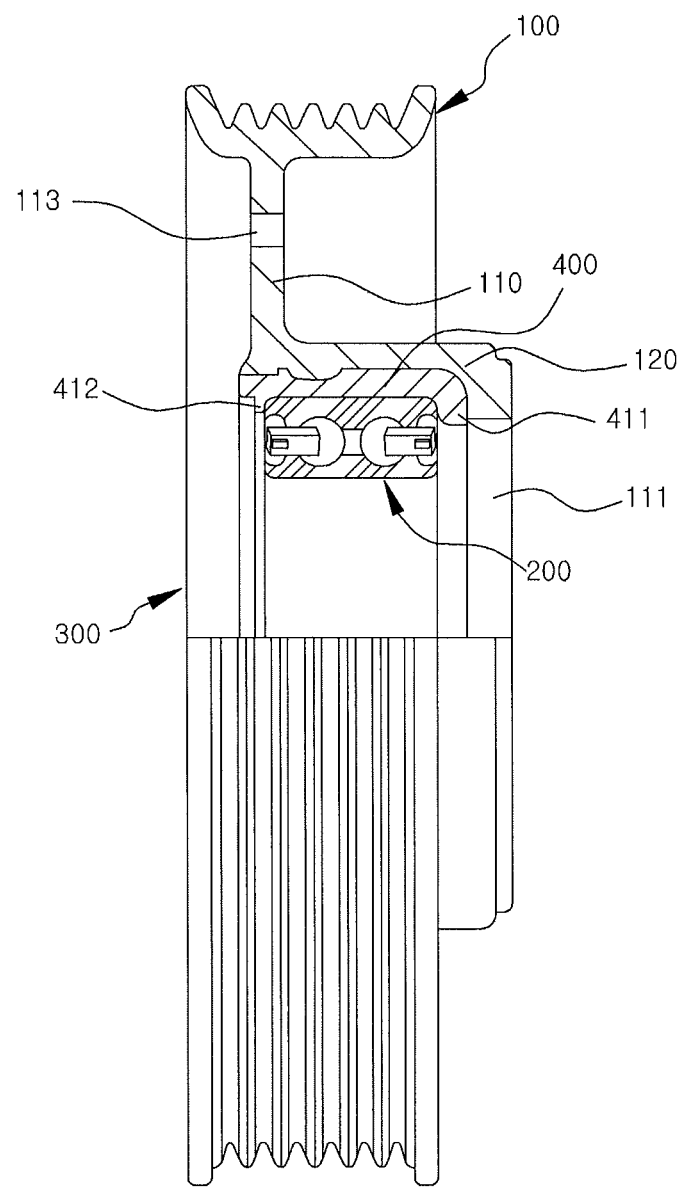

Furthermore, as shown in FIG. 10, the bearing 200 is forcedly pressed into the inner circumferential surface of the inner ring 400 of the pulley 100 to which the double surface treatment is finished through a series of processes as described above, and after that, ends of the inner ring 400 are caulked (S800) so as to prevent the bearing 200 from moving in the axial direction of the inner ring 400.

Finally, the pulley assembly for the compressor according to the present invention is completely manufactured through a series of the processes described above.

Additionally, the manufactured pulley assembly can reduce its total weight because the pulley 100 is made of magnesium alloy, and prevent malfunction because the inner ring 400 formed integrally with the pulley 100 through insert injection molding stably fixes and supports the bearing 200 even though the pulley 100 is thermally expanded due to a high-temperature situation.

Particularly, because the inner ring 400 has a plurality of the receiving grooves 420 which is formed on the outer circumferential surface of the inner ring 400 and the boss 120 has the receiving protrusion 121 which is formed on a portion of the inner circumferential surface of the boss 120 by injection-molding of the pulley 100 and is accommodated in the receiving groove 420, the inner ring 400 and the pulley 100 are combined together more stably.

What is claimed is:

1. A pulley assembly of a compressor, which includes a cylindrical hollow pulley and a bearing disposed on the inner circumferential surface of the pulley,
   wherein the pulley is made of magnesium alloy,
   wherein a cylindrical inner ring is formed integrally with the inner circumferential surface of the pulley by insert injection molding, the inner ring being made of a different material from the pulley; and
   wherein the bearing is fixed to the inner circumferential surface of the inner ring,
   wherein a first coating layer having an oxide film layer formed by spark anodizing is formed on the outer surface of the pulley and a second coating layer having a resin layer formed by electrodeposition is formed on the surface of the first coating layer.

2. The pulley assembly according to claim 1, wherein the inner ring has movement prevention jaws respectively formed at both ends of an axial direction side thereof, and the bearing is prevented from moving in the axial direction of the inner ring by the movement prevention jaws.

3. The pulley assembly according to claim 1, wherein uneven portions are respectively formed on the outer circumferential surface of the inner ring and on the inner circumferential surface of the pulley in the opposite direction to each other.

4. The pulley assembly according to claim 3, wherein the uneven portions comprise:
   a receiving groove formed on the outer circumferential surface of the inner ring; and
   a receiving protrusion protruding from the inner circumferential surface of the pulley and being accommodated in the receiving groove.

5. The pulley assembly according to claim 4, wherein the receiving groove is inclined not to coincide with a circumferential direction and an axial direction of the inner ring.

6. The pulley assembly according to claim 1, wherein a plating layer is formed on the outer circumferential surface of the inner ring.

7. The pulley assembly according to claim 6, wherein the plating layer formed on the outer circumferential surface of the inner ring is formed by one of zinc galvanizing, electroless nickel plating, zinc-nickel plating, and phosphate-zinc plating.

8. The pulley assembly according to claim 1, wherein a resin-based coating layer is formed on the outer circumferential surface of the inner ring.

9. The pulley assembly according to claim 8, wherein the resin-based coating layer formed on the outer circumferential surface of the inner ring is coated with resin having heat-resistance temperature of more than 250° C.

10. The pulley assembly according to claim 1, wherein the first coating layer has a coating thickness within a range of 5 μm to 40 μm.

11. The pulley assembly according to claim 1, wherein the second coating layer has a coating thickness within a range of 5 μm to 40 μm.

* * * * *